US012600026B2

(12) United States Patent
Shiao

(10) Patent No.: US 12,600,026 B2
(45) Date of Patent: Apr. 14, 2026

(54) MAGNETIC CLEANING DEVICE

(71) Applicant: Hsuan-Sen Shiao, Taichung City (TW)

(72) Inventor: Hsuan-Sen Shiao, Taichung City (TW)

( * ) Notice: Subject to any disclaimer, the term of this patent is extended or adjusted under 35 U.S.C. 154(b) by 953 days.

(21) Appl. No.: 17/857,695

(22) Filed: Jul. 5, 2022

(65) Prior Publication Data

US 2023/0037895 A1 Feb. 9, 2023

(30) Foreign Application Priority Data

Aug. 6, 2021 (JP) ................................. 2021-129881
Nov. 30, 2021 (JP) ................................. 2021-194749

(51) Int. Cl.
*B25J 1/04* (2006.01)
*B25J 15/06* (2006.01)
*B25J 18/02* (2006.01)
*B25J 18/06* (2006.01)

(52) U.S. Cl.
CPC ............. *B25J 1/04* (2013.01); *B25J 15/0608* (2013.01); *B25J 18/025* (2013.01); *B25J 18/06* (2013.01)

(58) Field of Classification Search
CPC ... B25J 1/04; B25J 1/02; B25J 15/0608; B25J 18/025; B25J 18/06; E01H 1/12; E01H 1/14; B03C 2201/20; B03C 1/0332; B03C 1/035; B03C 1/284; B25B 11/002; B25B 9/00; B25G 1/04; H01F 7/0257
See application file for complete search history.

(56) References Cited

U.S. PATENT DOCUMENTS

| 5,381,319 A * | 1/1995 | Shiao | ..................... | B25B 11/002 |
| | | | | 362/120 |
| 5,615,920 A * | 4/1997 | O'Kane | ................ | F21V 33/008 |
| | | | | 294/65.5 |
| 5,647,623 A * | 7/1997 | Shiao | ......................... | B25J 1/04 |
| | | | | 362/120 |
| 7,052,155 B2 * | 5/2006 | Gavin | ................. | F21V 33/0084 |
| | | | | 362/120 |
| 8,162,363 B2 * | 4/2012 | Wang | .................. | B25B 23/0021 |
| | | | | 362/120 |

FOREIGN PATENT DOCUMENTS

CN 109351471 A * 2/2019 ............... B03C 1/02

OTHER PUBLICATIONS

CN109351471A—Google Patents English Translation (Year: 2018).*

* cited by examiner

*Primary Examiner* — Stephen A Vu
(74) *Attorney, Agent, or Firm* — DLA PIPER LLP (US); Blake W. Jackson; Thomas J. Fuller

(57) ABSTRACT

A magnetic cleaning device includes a handle unit, a main unit, and a deforming mechanism. The main unit includes a housing and a magnetic member. The deforming mechanism is connected between the handle unit and the main unit. The housing defines an accommodating space extending along an axis. The magnetic member is disposed in the accommodating space, and is movable along the axis between an attraction position, where the magnetic member is adjacent to an end of the housing, and a non-attraction position, where the magnetic member is away from the end of the housing. The main unit is movable relative to the handle unit via operation of the deforming mechanism.

15 Claims, 10 Drawing Sheets

MAGNETIC CLEANING DEVICE

CROSS-REFERENCE TO RELATED APPLICATIONS

This application claims priority of Japanese Patent Application No. 2021-129881, filed on Aug. 6, 2021, and Japanese Patent Application No. 2021-194749, filed on Nov. 30, 2021.

FIELD

The disclosure relates to a magnetic cleaning device, more particularly to a magnetic cleaning device for retrieving magnetically attractable objects.

BACKGROUND

During manufacturing and processing, small magnetically attractable objects, such as screws and nuts, are regularly dropped on the ground. A magnetic pickup tool is the most typical tool used for retrieving these objects.

A conventional magnetic pickup tool has a magnet member inserted at the front end of an elongated rod. When using the conventional magnetic pickup tool to retrieve magnetically attractable items, the user simply holds the rear end of the elongated rod and approaches the magnetically attractable items with the magnet member; the magnetically attractable items are then attached to the magnet member, allowing the user to retrieve the magnetically attractable items without bending or crouching down.

However, it requires manual removal of the magnetically attractable items from the conventional magnetic pickup tool, which is laborious and inconvenient. When the magnetically attractable items are sharp, the user's hand may be injured.

Referring to FIG. 1, an existing magnetic pickup tool disclosed in Chinese Patent Publication No. CN109351471A includes an elongated tube member 91, a seat body 92 connected to one end of the tube member 91 and defining an internal space 93, a plunger member 94 having an end that extends into the inner space 93, and a magnet member 95 connected co-movably to the one end of the plunger member 94 and disposed in the internal space 93. The seat body 92 has an end plate 921 positioned at an end of the seat body 92 that is opposite to the tube member 91.

When a user moves the plunger member 94 relative to tube member 91, the magnet member 95 is brought close to or away from the end plate 921, and allowing magnetically attractable items (not shown) to be attached to the end plate 921 or released from the end plate 921.

In this way, the existing magnetic pickup tool can pick up magnetically attractable items using the magnetism of the magnet member 95. With the elongate tube member 91, the user does not have to bend over or crouch during use, thereby reducing fatigue. Furthermore, because the attracted magnetically attractable items can be released from the end plate 921 by operating the plunger member 94 relative to the tube member 91, the attracted magnetically attractable items do not need to be manually removed.

In addition, the existing magnetic pickup tool further includes a spring 96 disposed in the internal space 93 and sleeved on the plunger member 94 for biasing the magnet member 95 toward the end plate 921, thereby keeping stability of the magnet member 95 for magnetic attraction.

However, the tube member 91 is usually too long for the sake of pickup convenience; the length of tube member 91 cannot be adjusted during use to ensure that the plunger member 94 can move along the tube member 91 to control the location of the magnet member 95. The lengthy tube member 91 may cause problems in operation when utilized in a compact site, in addition to being difficult to carry. Furthermore, since the plunger member 94 is required to be movable relative to the tube member 91, the plunger member 94 and the tube member 91 can only be made straight and inflexible, which means that picking up magnetically attractable items in a limited area (not shown) or from the bottom of a machine may be difficult.

FIG. 2 illustrates another existing magnetic pickup tool disclosed by Chinese Patent Publication No. CN201380479Y, which includes a tube member 96 and a plunger member 97 that are telescopically connected, so that the user can adjust the overall length of the magnetic pickup tool. However, the tube member 96 must have a large diameter to accommodate the telescopic plunger member 97; further arrangement is also required to secure the tube member 96 at a desired position relative to the plunger member 97, increasing the overall volume of this existing magnetic pickup tool and raising the manufacturing cost. Moreover, this magnetic pickup tool also has the above-mentioned problem regarding the direction or angle constraints.

SUMMARY

Therefore, the object of the disclosure is to provide a magnetic cleaning device.

According to the disclosure, the magnetic cleaning device includes a handle unit, a main unit, and a deforming mechanism. The main unit includes a housing and a magnetic member. The deforming mechanism is connected between the handle unit and the main unit. The housing defines an accommodating space extending along an axis. The magnetic member is disposed in the accommodating space, and is movable along the axis between an attraction position, where the magnetic member is adjacent to an end of the housing, and a non-attraction position, where the magnetic member is away from the end of the housing. The main unit is movable relative to the handle unit via operation of the deforming mechanism.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
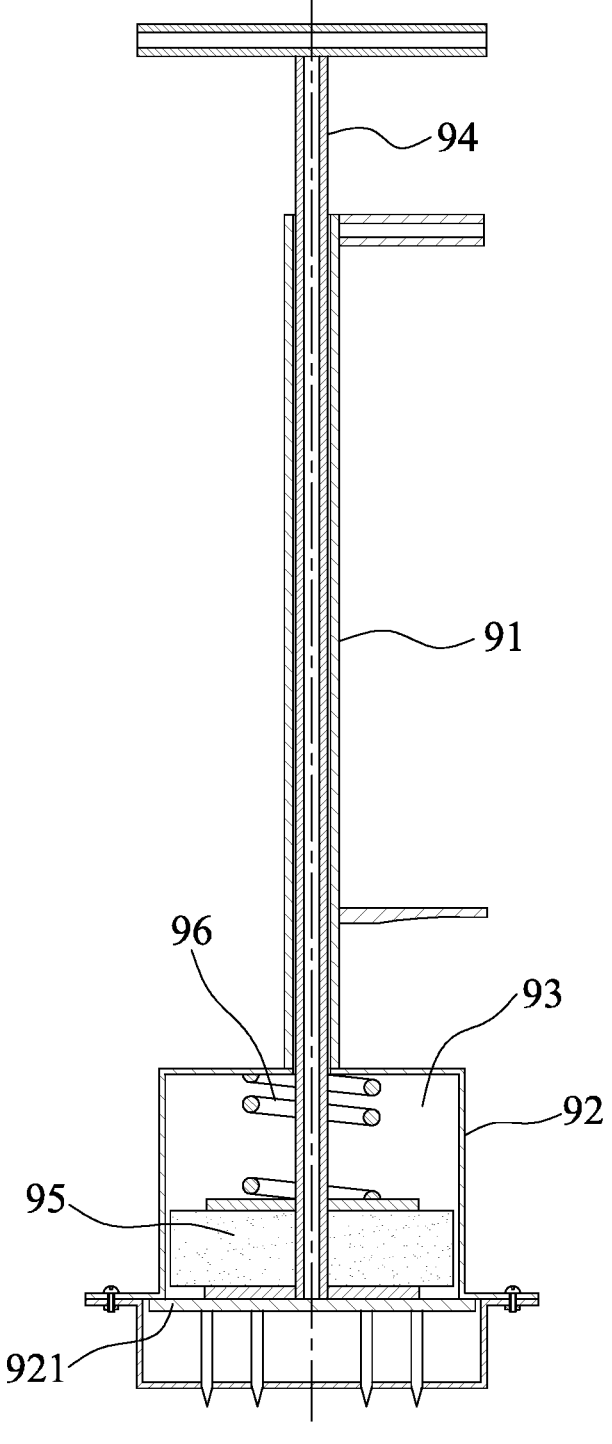
FIG. 1 is a cross-sectional view of an existing magnetic pickup tool disclosed in Chinese Patent Publication No. CN109351471A.
Figure 2:
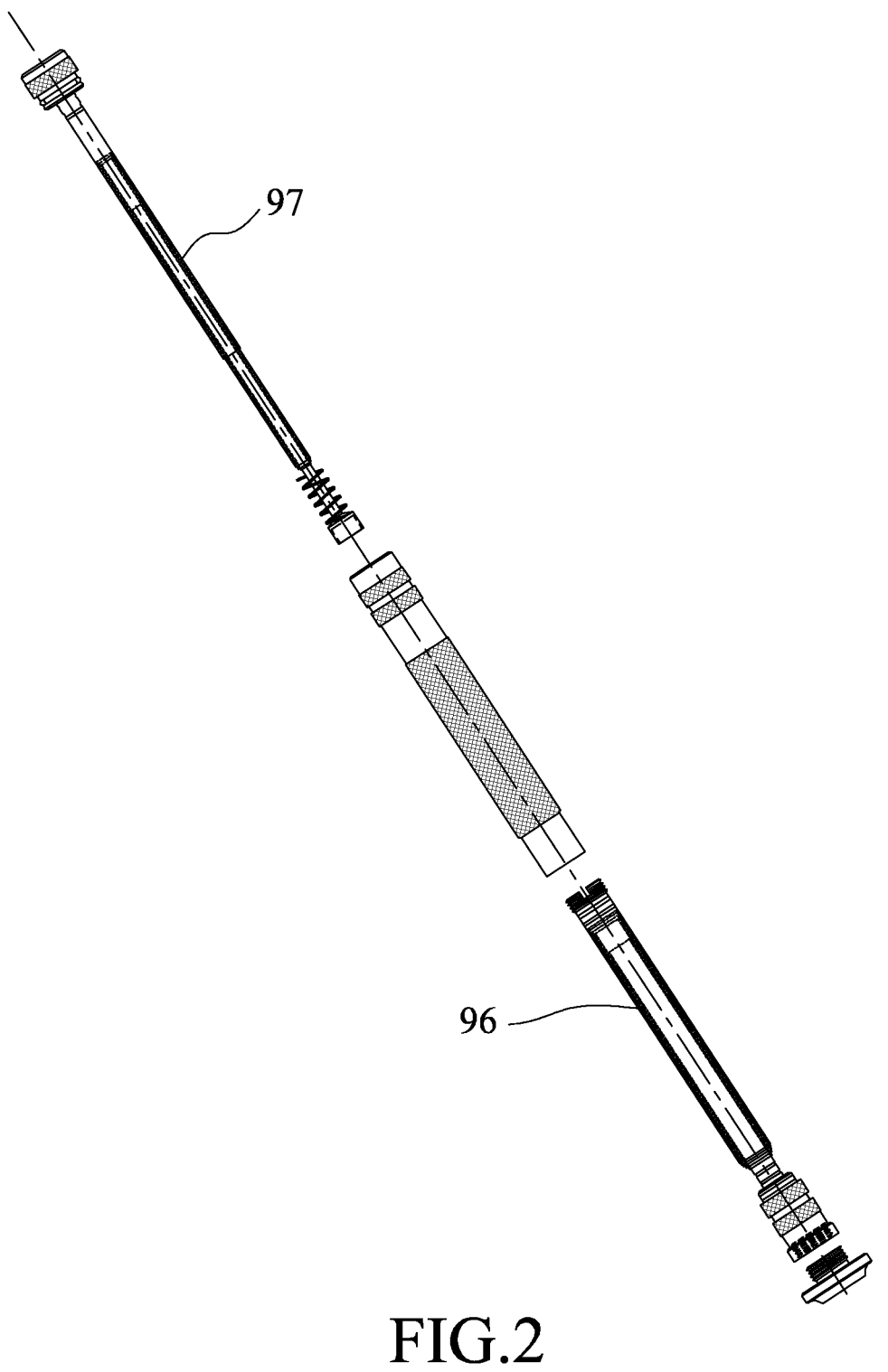
FIG. 2 is an exploded side view of another existing magnetic pickup tool disclosed in Chinese Patent Publication No. CN201380479Y.
Figure 3:
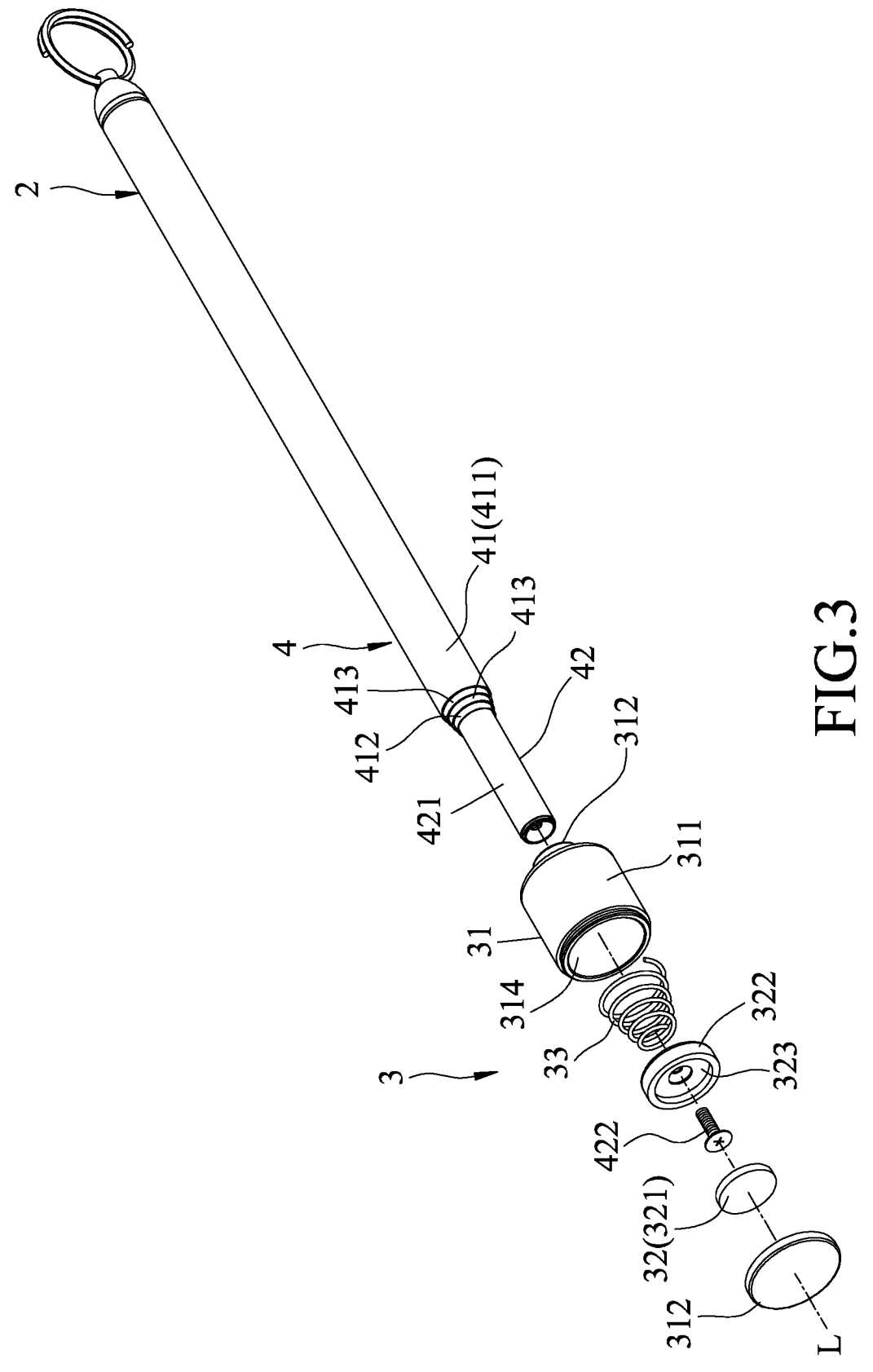
FIG. 3 is a partly exploded perspective view of an embodiment of the magnetic cleaning device according to the disclosure.

Before the present invention is described in greater detail, it should be noted that where considered appropriate, reference numerals or terminal portions of reference numerals have been repeated among the figures to indicate corresponding or analogous elements, which may optionally have similar characteristics.

Referring to FIGS. 3 to 7, a first embodiment of the magnetic cleaning device is shown.

The first embodiment of the magnetic cleaning device includes a handle unit 2, a main unit 3, and a deforming mechanism 4 connected between the handle unit 2 and the main unit 3.

The main unit 3 includes a housing 31 and a magnetic member 32. The housing 31 defines an accommodating space 314 extending along an axis (L), and the magnetic member 32 is disposed in the accommodating space 314.

Figure 6:
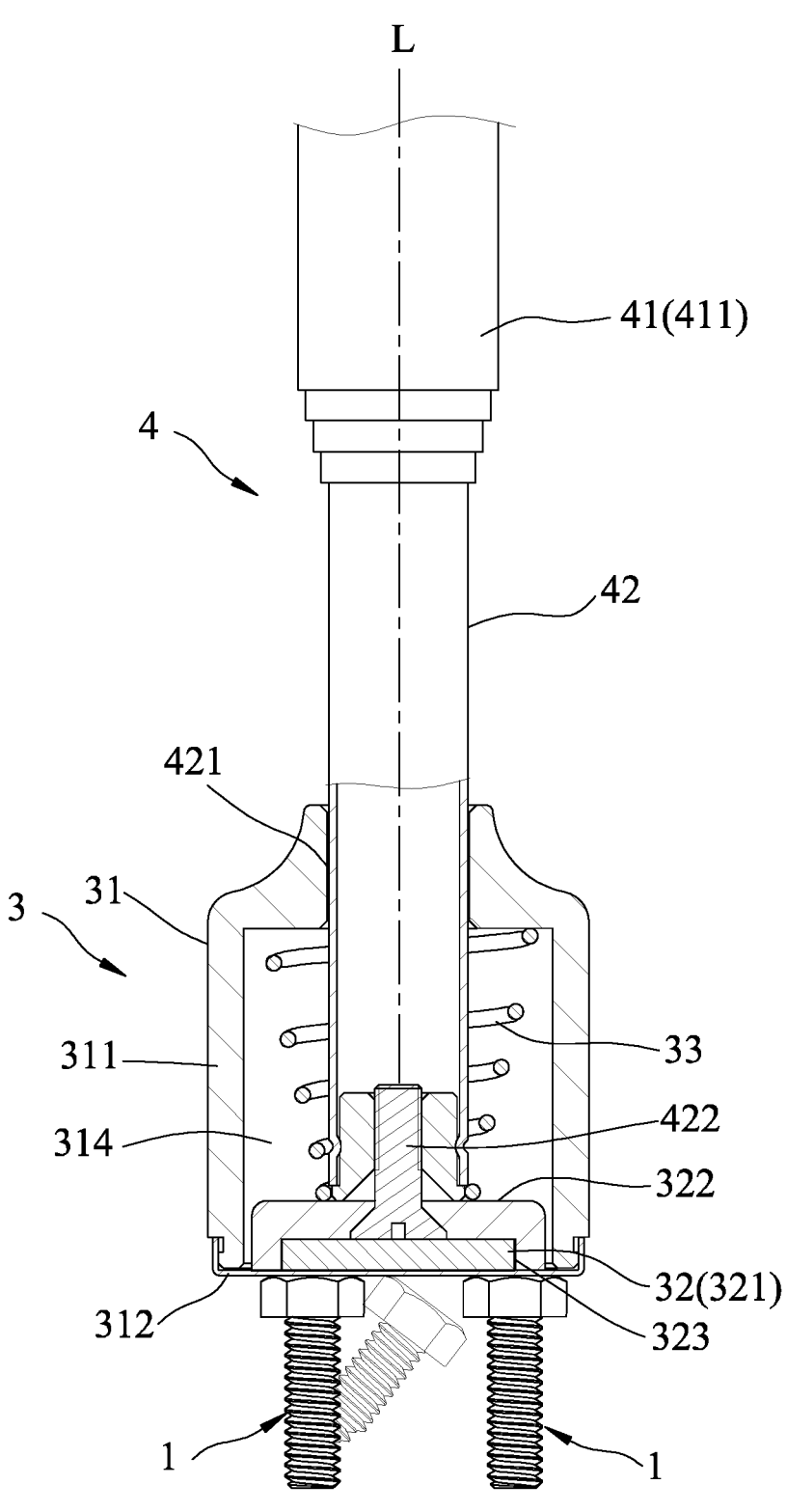
FIG. 6 is a fragmentary partly cross-sectional view illustrating magnetically attractable items being attracted picked up by the magnetic cleaning device when the magnetic cleaning device is in the attraction position.
Figure 7:
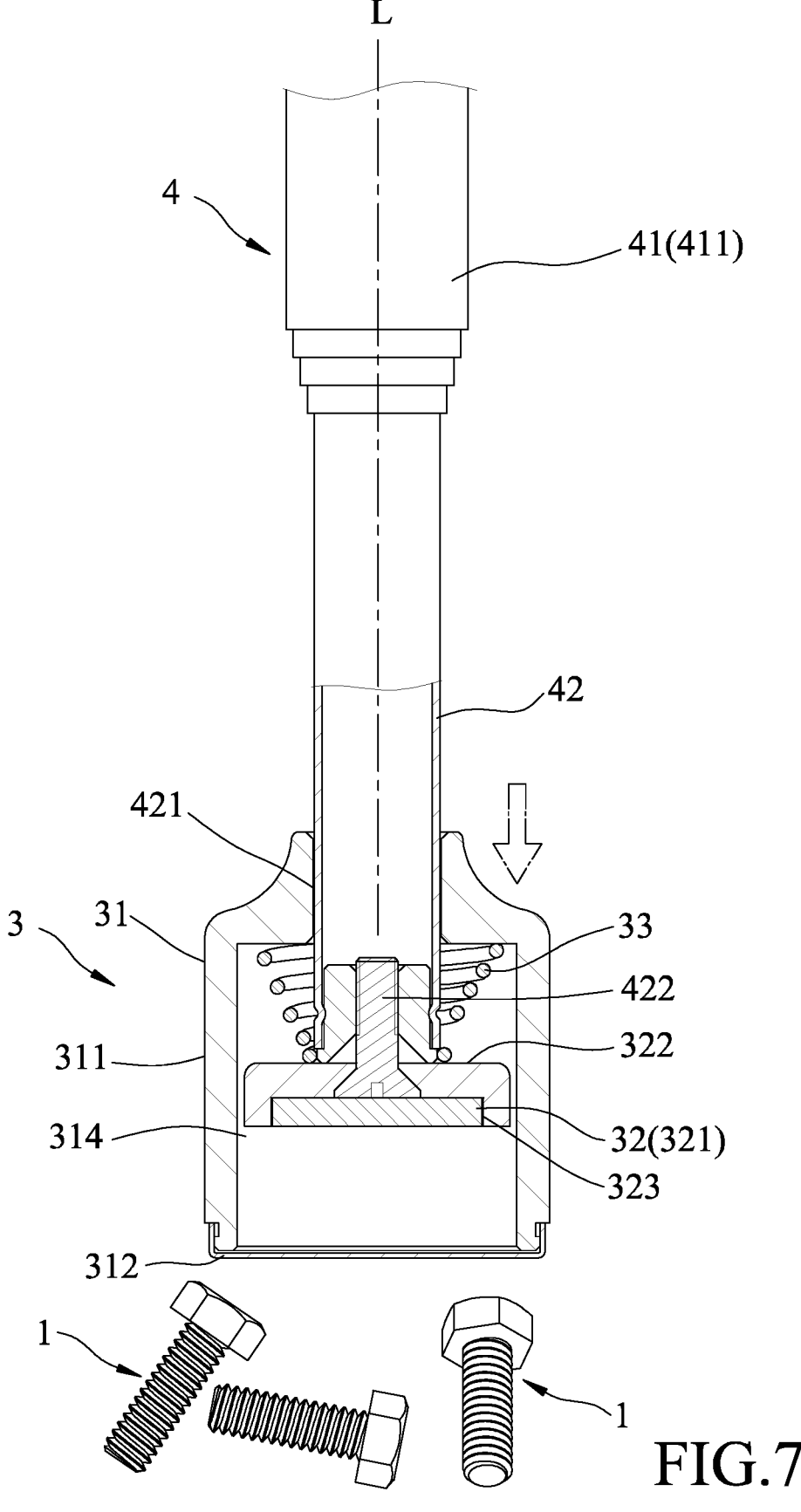
FIG. 7 is a view similar to FIG. 6, but illustrating that the magnetically attractable items are released from the magnetic cleaning device, and the magnetic cleaning device is located at a non-attraction position.

The magnetic member 32 is movable along the axis (L) between an attraction position (as shown in FIGS. 6), and a non-attraction position (as shown in FIG. 7), where said magnetic member 32 is away from the end of the housing 31.

Additionally, the housing 31 has a tubular opening section 311 formed on a lower end, and a cap 312 covering the opening section 311.

When the magnetic member 32 is in the attraction position, the magnetic member 32 is adjacent to an end of the housing 31.

In this embodiment, the main unit 3 further includes a resilient member 33.

The resilient member 33 is a coil compression spring, and has opposite two ends that are connected respectively to the housing 31 and the magnetic member 32 for biasing the magnetic member 32 towards the attraction position.

Additionally, the magnetic member 32 has a magnetic main body 321 configured as a magnet, and a support portion 322 made of a plastic material and supporting the magnetic main body 321 thereon.

The support portion 322 has a receptacle space 323 for accommodating the magnetic member 32.

As shown in FIG. 6, when the magnetic member 32 is moved to the attraction position, the magnetic main body 321 is able to collect a plurality of fasteners 1 via a magnetic force exerted by the magnetic main body 321. In the attraction position, the magnetic main body 321 attracts the fasteners 1 with enough magnetic force so that the magnetic cleaning device may collect the fasteners 1.

Then, referring to FIG. 7, when the housing 31 is operated to move the magnetic member 32 to the non-attraction position, the magnetic member 32 is away from the end of the housing 31, and the magnetic force exerted by the magnetic main body 321 is no longer strong enough for attracting the fasteners 1, and the fasteners 1 will fall off the magnetic cleaning device.

The main unit 3 is movable relative to the handle unit 2 via operation of the deforming mechanism 4. The deforming mechanism 4 includes a first connecting portion 41 that is connected to the handle unit 2, and a second connecting portion 42 that is connected to the main unit 3.

The second connecting portion 42 includes an insertion rod 421 that is inserted into the housing 31 and that is connected to the magnetic member 32.

In this embodiment, the insertion rod 421 is secured to the support portion 322 of the magnetic member 32 via a screw 422.

Additionally, the resilient member 33 is a coil spring that is sleeved on the insertion rod 421.

In this embodiment, the deforming mechanism 4 has a wide tube portion 411 connected to the handle unit 2, and a narrow tube portion 412 having an end that is connected telescopically to the wide tube portion 411, and an opposite end that is connected to the main unit 3 indirectly via the insertion rod 421.

It should be noted that, the wide tube portion 411 may be directly or indirectly connected to the handle unit 2, and the opposite end of the narrow tube portion 412 may be directly or indirectly connected to the main unit 3.

Figure 4:
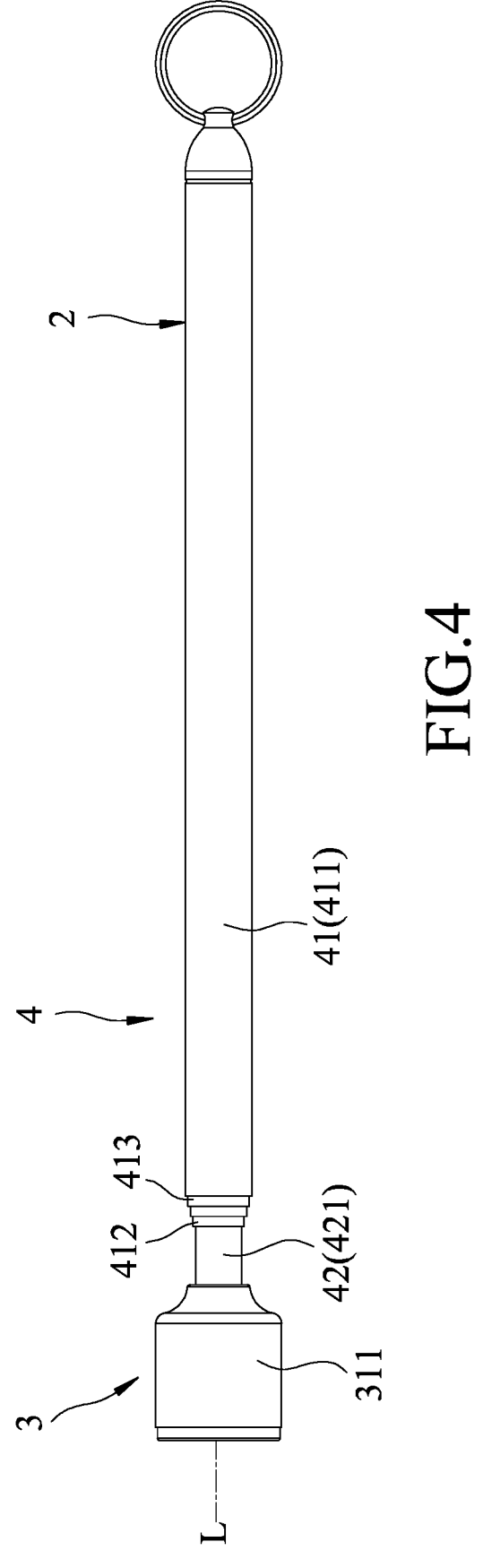
FIG. 4 is a side view of the embodiment with a plurality of telescopic segments in a collapsed state.
Figure 5:
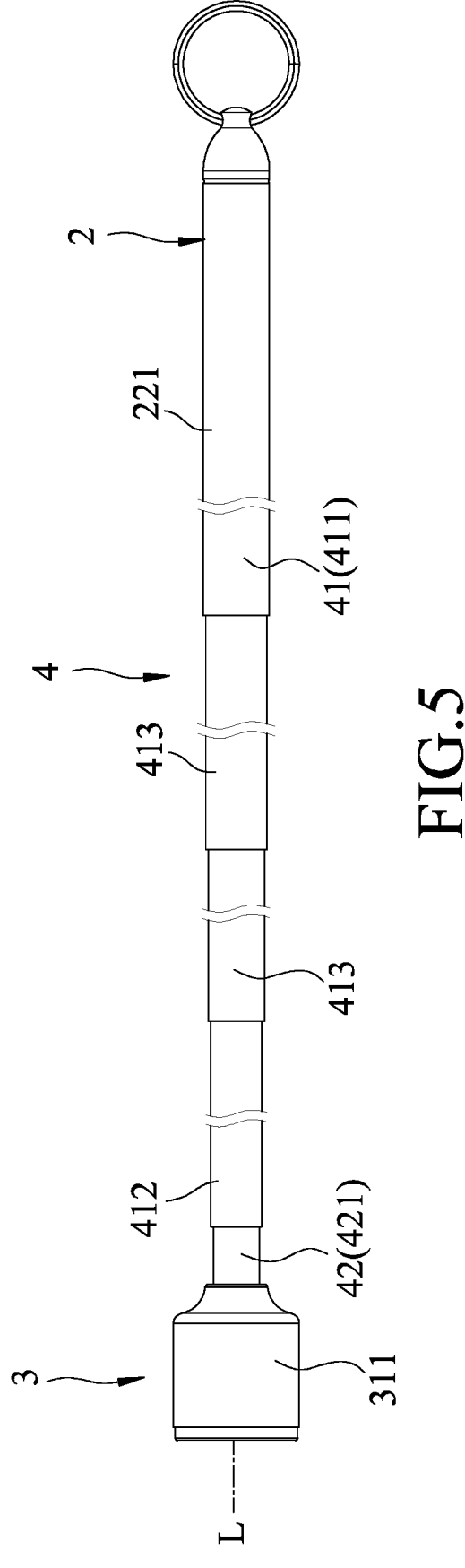
FIG. 5 is a side view of the embodiment with the telescopic segments in an extended state.

Referring to FIGS. 4 and 5, by virtue of the telescopic connection between the narrow tube portion 412 and the wide tube portion 411, the magnetic cleaning device is able to extend or retract to change the distance between the handle unit 2 and the main unit 3.

Additionally, in this embodiment, the first connecting portion 41 of the deforming mechanism 4 further has two medial tube portions 413 that are disposed between the wide tube portion 411 and the narrow tube portion 412, and that are respectively and telescopically connect to the wide tube portion 411 and the narrow tube portion 412. Therefore, the telescopic extension of the magnetic cleaning device is increased via the medial tube portions 413.

It should be noted that, in other embodiments, the number of the medial tube portions 413 may be changed to adjust the telescopic extension of the magnetic cleaning device. In other embodiments, the medial tube portions 413 may be omitted. In some embodiments, a mechanism for controlling the magnetic member 32 may be disposed in the narrow tube portion 412.

Figure 8:
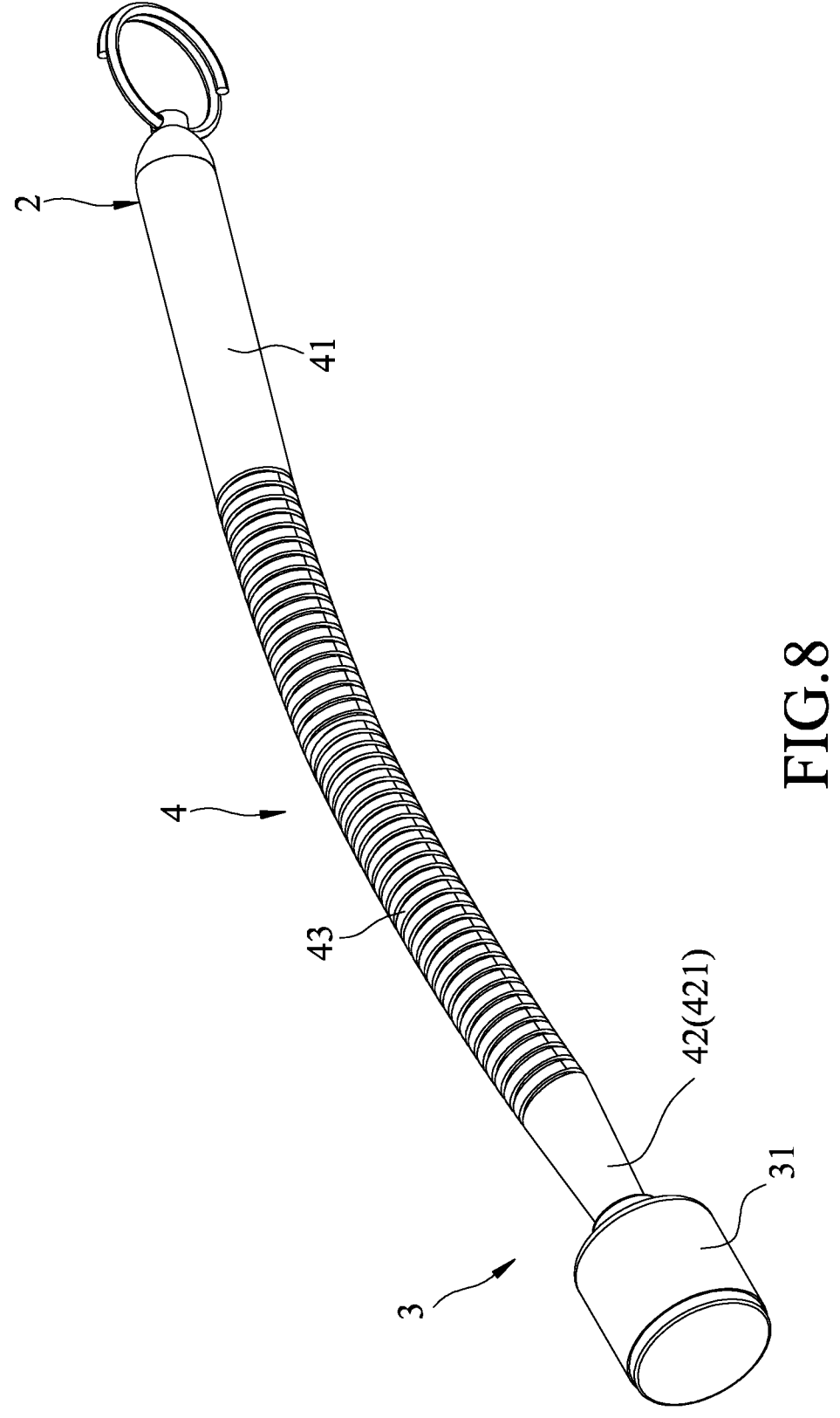
FIG. 8 is a perspective view of another embodiment of the magnetic cleaning device according to the disclosure.

FIG. 8 shows a second embodiment of the magnetic cleaning device according to the disclosure.

In the second embodiment, the deforming mechanism 4 further includes a bellows portion 43 having opposite ends that are connected respectively to the first and second connecting portions 41, 42.

The bellows portion 43 is flexible and allows the magnetic cleaning device to be bent in different directions, and extended or retracted.

Figure 9:
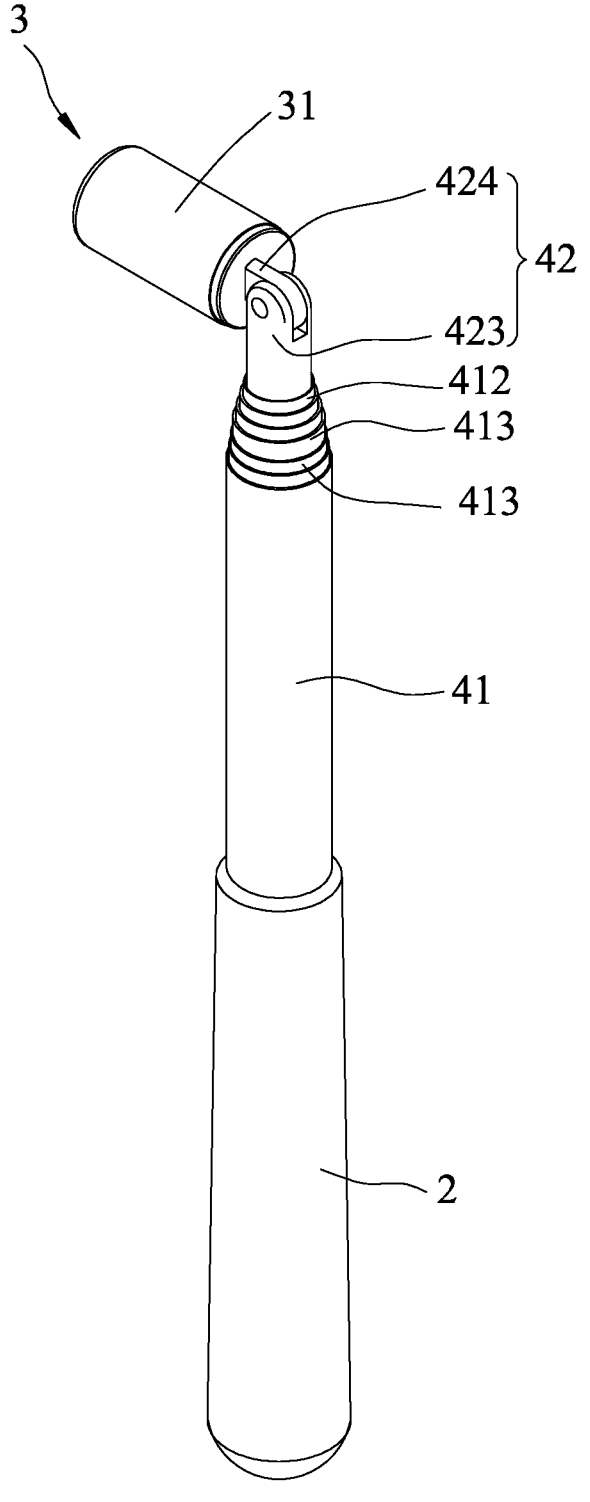
FIG. 9 is a perspective view of another embodiment of the magnetic cleaning device according to the disclosure.

FIG. 9 illustrates a third embodiment of the magnetic cleaning device according to the disclosure.

The third embodiment is similar to the first embodiment. However, there are a few differences between the two embodiments.

In the third embodiment, the wide tube portion 411 of the first connecting portion 41 of the deforming mechanism 4 is formed in one piece with the handle unit 2.

The second connecting portion 42 of the deforming mechanism 4 has a first pivot segment 423 connected to the handle unit 2 via the narrow tube portion 412 and the medial tube portion 413 of the first connecting portion 41, and a second pivot segment 424 connected pivotally to the first pivot segment 423 and connected to the main unit 3.

By virtue of the first pivot segment 423 and the second pivot segment 424 being able to pivot and rotate, the angle between the handle unit 2 and the main unit 3 can be changed.

In other variations of the embodiment, the pivot segment 423 may be directly connected to the handle unit 2, however, this is not a limitation of the present disclosure.

Figure 10:
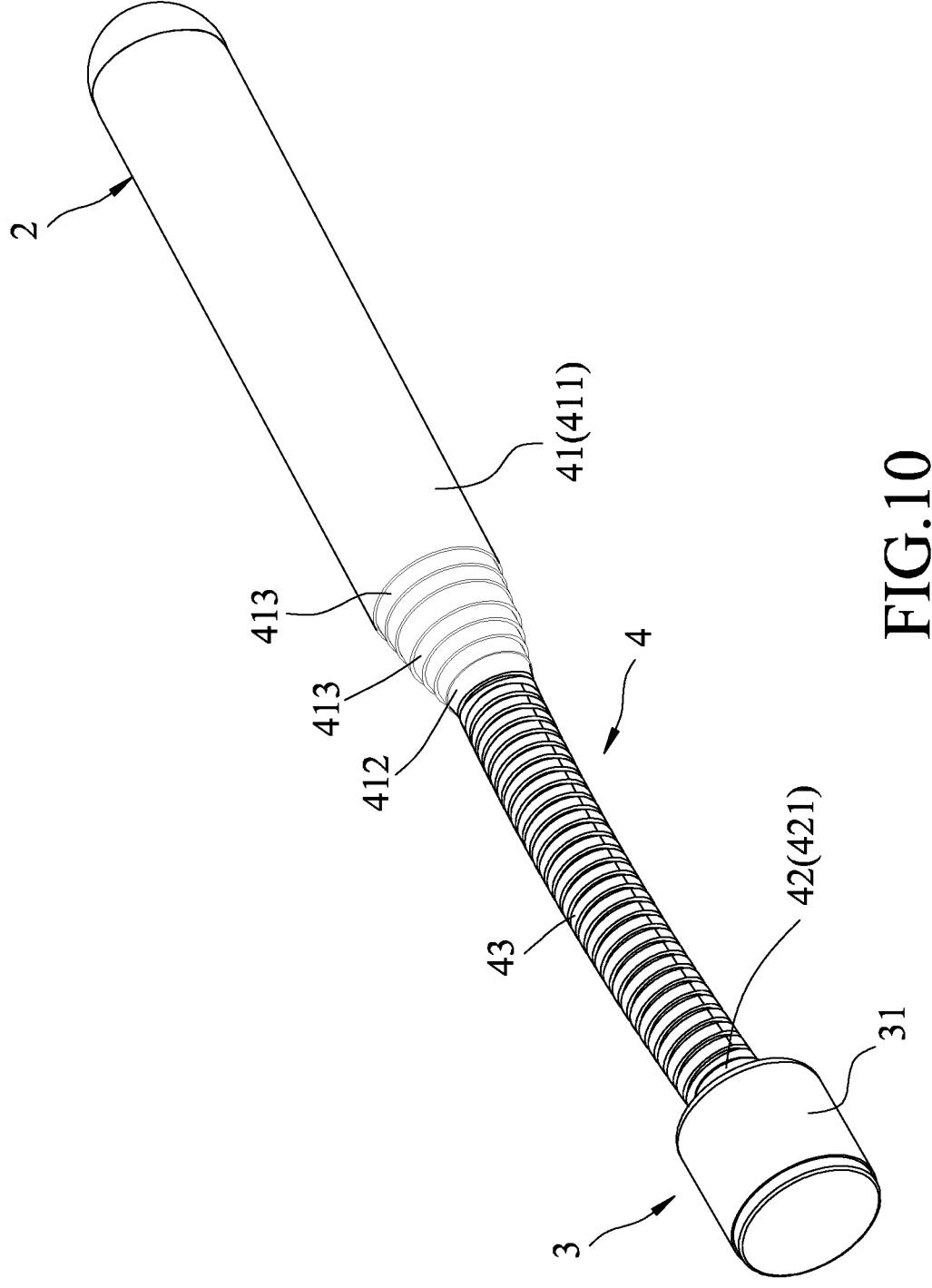
FIG. 10 is a perspective view of still another embodiment of the magnetic cleaning device according to the disclosure.

Referring to FIG. 10, a fourth embodiment of the magnetic cleaning device according to the present disclosure is shown.

The fourth embodiment is also similar to the first embodiment, except for the following differences.

In the fourth embodiment, the wide tube portion 411 of the connecting portion of the deforming mechanism 4 is formed in one piece with the handle unit 2.

The deforming mechanism 4 further includes a bellows portion 43.

By virtue of the bellows portion 43, the angle and extension between the handle unit 2 and the main unit 3 can be adjusted.

In other embodiments, the deforming mechanism 4 may have various extension or deforming mechanisms in the first connecting portion 41 and the second connecting portion 42 to provide more flexibility to the magnetic cleaning device for a user.

In summary the magnetic cleaning device includes the deforming mechanism 4 that allows adjustment of the length or angle between the handle unit 2 and the main unit 3, making the magnetic cleaning device easy to operate.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A magnetic cleaning device comprising:
   a handle unit;
   a main unit including a housing and a magnetic member; and
   a deforming mechanism connected between said handle unit and said main unit;
   wherein said housing defines an accommodating space extending along an axis;
   wherein said magnetic member is disposed in said accommodating space, and is movable along the axis between an attraction position, where said magnetic member is adjacent to an end of said housing, and a non-attraction position, where said magnetic member is away from said end of said housing;
   wherein said main unit is movable relative to said handle unit via operation of said deforming mechanism;
   wherein said main unit further includes a resilient member having opposite two ends that are connected respectively to said housing and said magnetic member for biasing said magnetic member toward the attraction position; and
   wherein said deforming mechanism includes a first connecting portion connected to said handle unit, and a second connecting portion connected to said main unit, and including an insertion rod that is inserted into said housing and that is connected to said magnetic member.

2. The magnetic cleaning device as claimed in claim 1, wherein:
   said magnetic member has a magnetic main body configured as a magnet, and a support portion made of a plastic material and supporting said magnetic main body thereon; and
   said opposite two ends of said resilient member are connected respectively to said housing and said support portion of said magnetic member.

3. The magnetic cleaning device as claimed in claim 1, wherein said deforming mechanism has:
   a wide tube portion connected to said handle unit; and
   a narrow tube portion having an end that is connected telescopically to said wide tube portion, and an opposite end that is connected to said main unit.

4. The magnetic cleaning device as claimed in claim 3, wherein said deforming mechanism includes:
   a first connecting portion connected to said handle unit, and having said wide tube portion and said narrow tube portion;
   a second connecting portion connected to said main unit; and
   a bellows portion having opposite ends that are connected respectively to said first and second connecting portions.

5. The magnetic cleaning device as claimed in claim 1, wherein said deforming mechanism has:
   a first pivot segment connected to said handle unit; and
   a second pivot segment connected pivotally to said first pivot segment and connected to said main unit.

6. The magnetic cleaning device as claimed in claim 1, wherein said deforming mechanism includes:
   a first connecting portion connected to said handle unit;
   a second connecting portion connected to said main unit; and
   a bellows portion having opposite ends that are connected respectively to said first and second connecting portions.

7. A magnetic cleaning device comprising:
   a handle unit;
   a main unit including a housing and a magnetic member; and
   a deforming mechanism connected between said handle unit and said main unit;
   wherein said housing defines an accommodating space extending along an axis;
   wherein said magnetic member is disposed in said accommodating space, and is movable along the axis between an attraction position, where said magnetic member is adjacent to an end of said housing, and a non-attraction position, where said magnetic member is away from said end of said housing;

wherein said main unit is movable relative to said handle unit via operation of said deforming mechanism;

wherein said main unit further includes a resilient member having opposite two ends that are connected respectively to said housing and said magnetic member for biasing said magnetic member toward the attraction position;

wherein said magnetic member has a magnetic main body configured as a magnet, and a support portion made of a plastic material and supporting said magnetic main body thereon; and wherein said opposite two ends of said resilient member are connected respectively to said housing and said support portion of said magnetic member.

8. The magnetic cleaning device as claimed in claim 7, wherein said deforming mechanism has:

a wide tube portion connected to said handle unit; and a narrow tube portion having an end that is connected telescopically to said wide tube portion, and an opposite end that is connected to said main unit.

9. The magnetic cleaning device as claimed in claim 8, wherein said deforming mechanism includes:

a first connecting portion connected to said handle unit, and having said wide tube portion and said narrow tube portion;

a second connecting portion connected to said main unit; and a bellows portion having opposite ends that are connected respectively to said first and second connecting portions.

10. The magnetic cleaning device as claimed in claim 7, wherein said deforming mechanism has:

a first pivot segment connected to said handle unit; and a second pivot segment connected pivotally to said first pivot segment and connected to said main unit.

11. The magnetic cleaning device as claimed in claim 7, wherein said deforming mechanism includes:

a first connecting portion connected to said handle unit;

a second connecting portion connected to said main unit; and a bellows portion having opposite ends that are connected respectively to said first and second connecting portions.

12. A magnetic cleaning device comprising:

a handle unit;

a main unit including a housing and a magnetic member; and a deforming mechanism connected between said handle unit and said main unit;

wherein said housing defines an accommodating space extending along an axis;

wherein said magnetic member is disposed in said accommodating space, and is movable along the axis between an attraction position, where said magnetic member is adjacent to an end of said housing, and a non-attraction position, where said magnetic member is away from said end of said housing;

wherein said main unit is movable relative to said handle unit via operation of said deforming mechanism; and wherein said deforming mechanism has a wide tube portion connected to said handle unit, and a narrow tube portion having an end that is connected telescopically to said wide tube portion, and an opposite end that is connected to said main unit.

13. The magnetic cleaning device as claimed in claim 12, wherein said deforming mechanism has:

a first pivot segment connected to said handle unit; and a second pivot segment connected pivotally to said first pivot segment and connected to said main unit.

14. The magnetic cleaning device as claimed in claim 12, wherein said deforming mechanism includes:

a first connecting portion connected to said handle unit;

a second connecting portion connected to said main unit; and a bellows portion having opposite ends that are connected respectively to said first and second connecting portions.

15. The magnetic cleaning device as claimed in claim 12, wherein said deforming mechanism includes:

a first connecting portion connected to said handle unit, and having said wide tube portion and said narrow tube portion;

a second connecting portion connected to said main unit; and a bellows portion having opposite ends that are connected respectively to said first and second connecting portions.

* * * * *